United States Patent [19]

Cavanaugh

[11] Patent Number: 4,881,484
[45] Date of Patent: Nov. 21, 1989

[54] AIR DEFLECTOR FOR SECURING BOAT TOP

[76] Inventor: John F. Cavanaugh, 210 E. Glassboro Ct., Box 10, Hernando, Fla. 32642

[21] Appl. No.: 227,437

[22] Filed: Jul. 29, 1988

Related U.S. Application Data

[63] Continuation of Ser. No. 50,690, May 18, 1987, abandoned.

[51] Int. Cl.⁴ .............................................. B63B 17/02
[52] U.S. Cl. ...................................... 114/361; 296/91; 296/217
[58] Field of Search .................... 114/361; 296/91, 217

[56] References Cited

U.S. PATENT DOCUMENTS

| | | | |
|---|---|---|---|
| 2,833,296 | 5/1958 | Woodruff | 114/361 |
| 2,937,652 | 5/1960 | Zimmer | 114/361 |
| 3,018,784 | 1/1962 | Buxman | 114/361 |
| 3,367,349 | 2/1968 | O'Link | 114/361 |
| 3,368,841 | 2/1968 | Grau | 296/91 |
| 4,085,665 | 4/1978 | Paxton | 296/91 |
| 4,174,863 | 11/1979 | Gotz | 296/91 |
| 4,179,154 | 12/1979 | Ingram | 296/91 |
| 4,630,859 | 12/1986 | Bienert et al. | 296/217 |
| 4,662,671 | 5/1987 | Davis | 296/217 |

FOREIGN PATENT DOCUMENTS

| | | | |
|---|---|---|---|
| 1008592 | 5/1957 | Fed. Rep. of Germany | 296/217 |
| 3512312 | 10/1985 | Fed. Rep. of Germany | 296/217 |
| 464291 | 6/1951 | Italy . | |
| 37527 | 2/1986 | Japan | 296/91 |

OTHER PUBLICATIONS

"Aqua Visor" in Taylor Made catalog, 1960, p. 16.

*Primary Examiner*—Sherman D. Basinger
*Assistant Examiner*—Thomas J. Braham

[57] ABSTRACT

An air deflector for a power boat has an airfoil mounted along the top frame of the windshield with brackets so as to form a gap between the airfoil and the windshield. Forward motion of the boat produces a downward flow of air into the cockpit area. A clamp bar is mounted on the top surface of the airfoil and includes snap fasteners for attaching the forward edge of a canvas top.

15 Claims, 4 Drawing Sheets

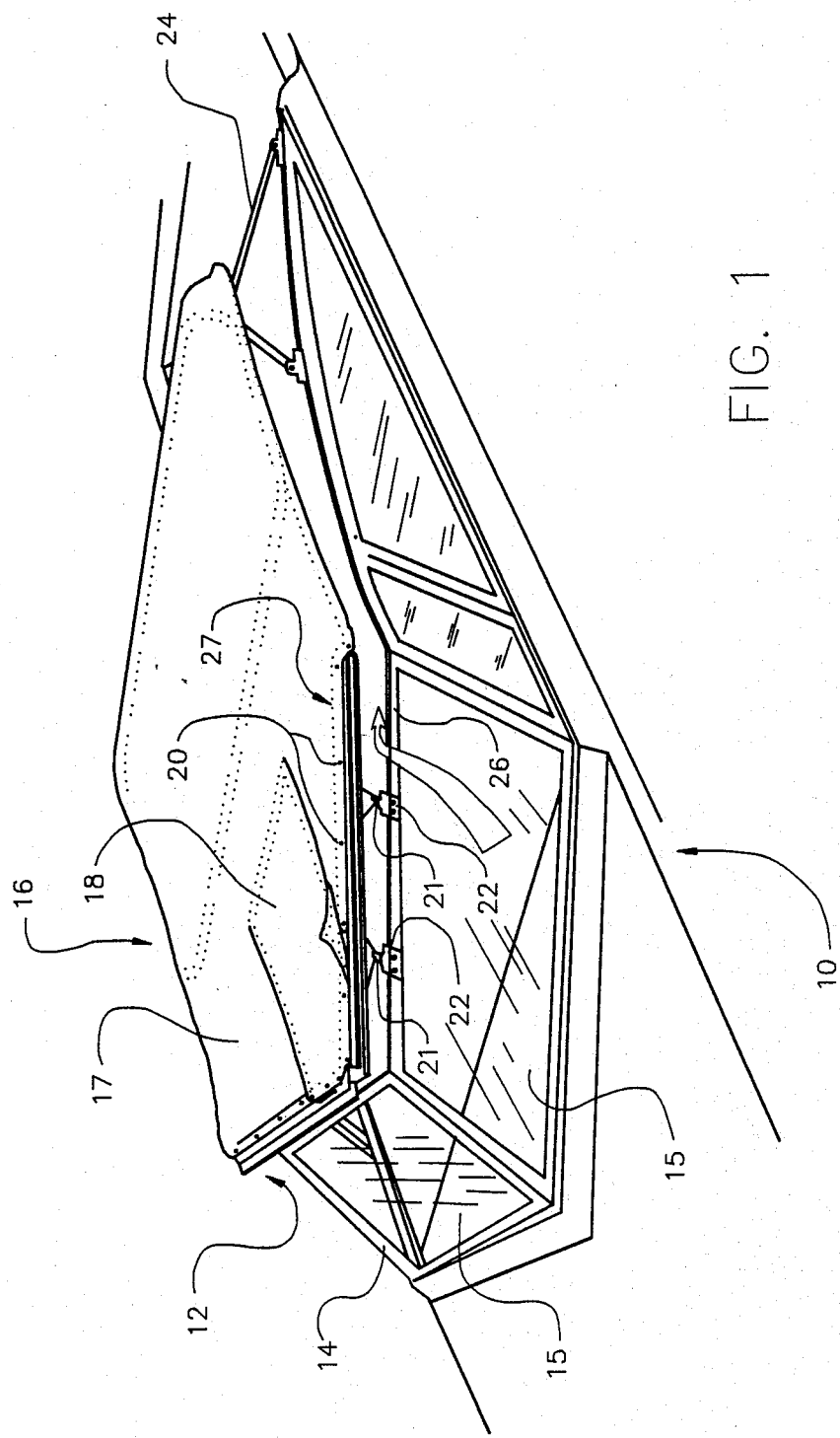

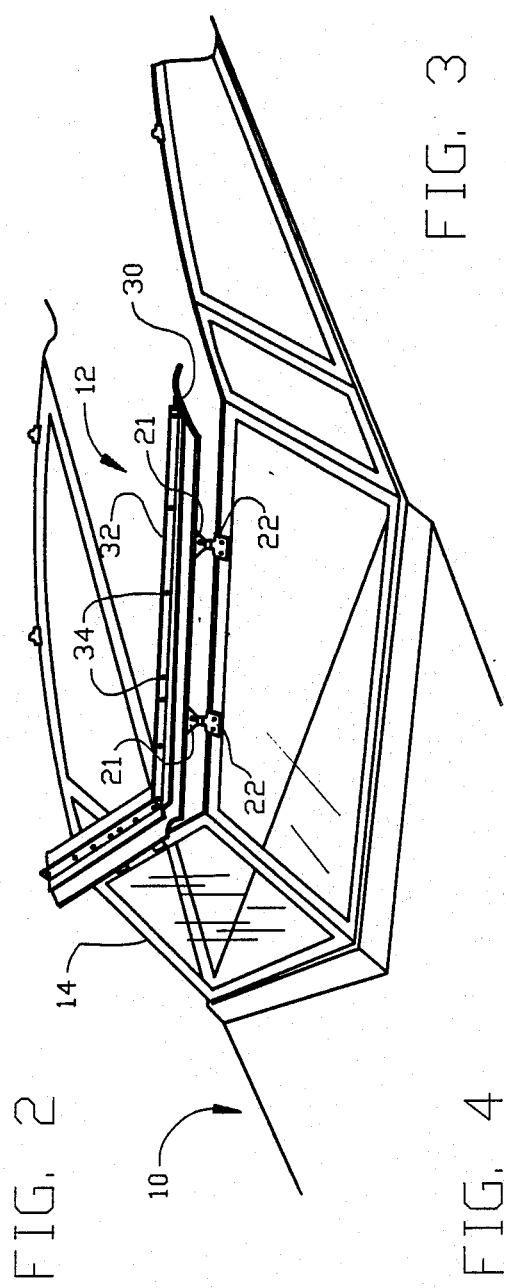
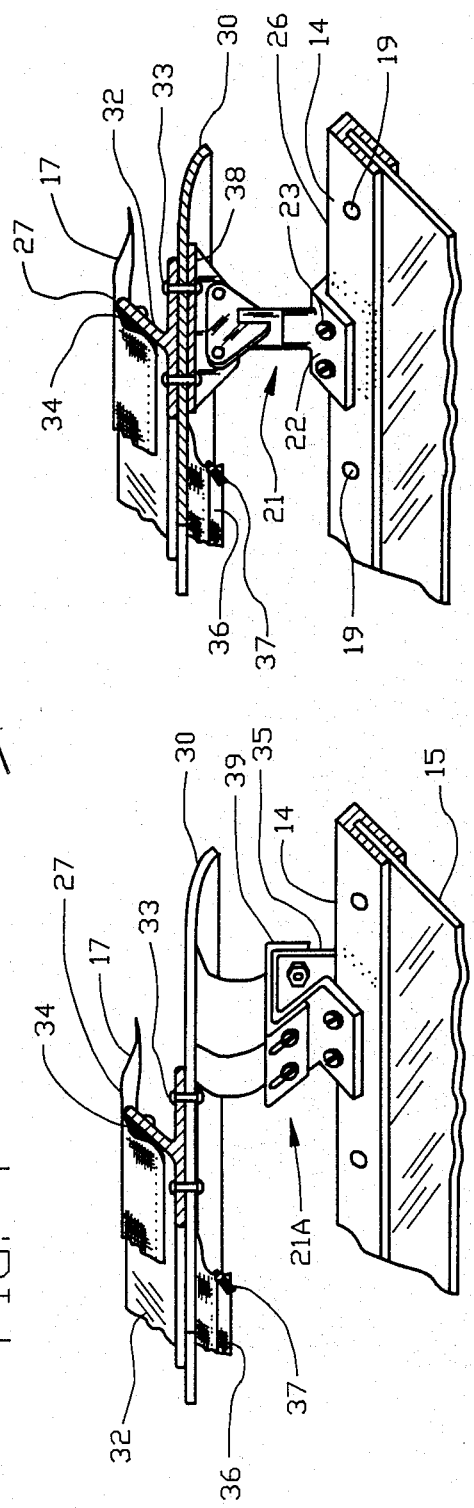

AIR DEFLECTOR FOR SECURING BOAT TOP

This application is a continuation of application Ser. No. 050,690, filed May 18, 1987, now abandoned, the disclosure of which is expressly incorporated as if fully set forth herein.

BACKGROUND OF THE INVENTION

1. Field of the Invention

The present invention is directed to an airfoil for attachment to the windscreen structure of pleasure boats, and more particularly to a device which will provide ventilation to the cockpit area when a top cover is in use.

2. Description of the Prior Art

Pleasure boats of the type commonly referred to as express or sport cruisers generally provide living space below a deck which gradually rises from the bow and terminates with a permanent windscreen or windshield structure. The helm and companion seat are located in a cockpit area immediately aft of the windshield. Protection from sun and rain for the cockpit area may be provided by a canvas boat top with clear plastic side curtains. Usually, the windshield frame will be provided with metal snaps or similar devices for connecting the forward end of the canvas top. When a canvas top or the like is used for protection from the bright sun, particularly in warm weather regions, the temperature in the cockpit area will rise rapidly. Even when the boat is cruising at high speed, very little air flow occurs in the cockpit area with resulting discomfort to the occupants.

Thus, the occupants have a choice of obtaining ventilation in sunny weather by not utilizing the top but face the danger of sunburn from excess exposure to the sun. Thus, there is a need for means to provide sun protection yet to maintain the cockpit area at a comfortable temperature by improving the airflow therethrough.

SUMMARY OF THE INVENTION

The present invention is an airfoil device for attachment along the top portion of the windshield structure of a power boat thereby producing a gap or opening between the airfoil and the windshield. The airfoil is formed to direct air flow downward into the cockpit area of the boat due to the wind or to the air flow caused by forward motion of the boat. The airfoil includes fasteners along the top surface thereof to which the forward end of a canvas top can be secured. As will now be understood, the canvas top may be put in place during hot weather operation under bright sun and the airfoil of the invention permits air flow into the cockpit from forward motion of the boat or wind when the boat is at anchor. Although the airfoil may be formed from any suitable material, the use of plastic is preferred for appearance and likeness.

It is therefore a principal object of the invention to provide means for ventilating the cockpit area of a pleasure boat when a canvas top or the like is in use.

It is another object of the invention to provide an airfoil attached to the upper edge of a new or existing boat windscreen and having a gap therebetween to permit air to enter into the cockpit.

It is still another object of the invention to provide an airfoil having a camber which will direct air downward into the cockpit area of the boat.

It is yet another object of the invention to provide an airfoil mounted to the top of a boat windshield structure for directing air into the cockpit and having fastening means along the upper edge thereof for securing the forward ends of a canvas top or the like.

These and other objects and advantages of the invention will become apparent from the following detail description when read in conjunction with the drawings.

BRIEF DESCRIPTION OF THE DRAWINGS

FIG. 1 is a view of the windshield area of a typical express cruiser type boat having the airfoil of the invention installed thereon and a canvas top in use;

FIG. 2 shows the airfoil of FIG. 1 with the canvas top removed to therefore show additional details thereof;

FIG. 3 is a sectional view of the airfoil of FIG. 1 showing a typical mounting structure;

FIG. 4 is a cross-sectional view of the airfoil of FIG. 1 showing an alternative mounting structure;

DETAILED DESCRIPTION OF THE PREFERRED EMBODIMENT

Figure 5:
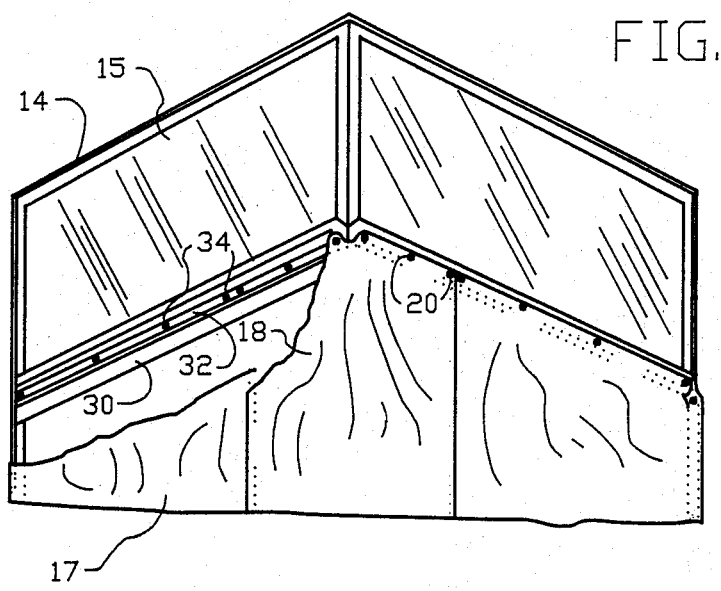
FIG. 5 is a top view of the airfoil of FIG. 1.

FIG. 1 shows the cockpit area of a sport or express cruiser type pleasure boat 10. A windshield assembly includes glass or plastic windshields 15 in a windshield frame 14. The air deflector of the invention shown generally at 12, is mounted to a top edge 26 of windshield frame 14 by mounting brackets 21 attached to frame 14 by clamps 22. As best seen in FIG. 2, air deflector 12 includes an airfoil 30 which is preferably of a suitable plastic, and a canvas clamp bar 32 which includes a plurality of fasteners shown as snaps 34 or the like. As will be noted from FIG. 1, a canvas top 16 supported at the aft of the cockpit by braces 24 is snapped to the canvas clamp bar 32 by snaps 20 along the forward edge 27 thereof. Canvas top 16 may include a top portion 17 and a sun flap portion 18. Typical air flow from wind or forward motion of the craft is indicated in FIG. 1 by the solid arrows.

Additional details of typical mounting brackets 21 may be seen in the partial cross-sectional view of FIG. 3. Each of the clamps 22 is attached to the top edge 26 windshield frame 14 by a pair of clamp screws 23. As shown in the cross-sectional view of airfoil 30, an upper portion 38 of mounting bracket 21 is fastened to airfoil 30 and canvas clamp bar 32 by rivets 33 or other suitable fastening means. Also seen in FIG. 3 is the forward edge 27 of canvas top 16 and snap 34.

During hot weather operation of the boat 10, it will be seen that wind or forward motion of the boat will cause air to flow through the gap between airfoil 30 and windshield frame 14. The aft downward curvature or camber of airfoil 30 will direct such air into the cockpit. When the canvas top 16 is in use during rain, it is desirable to prevent rain from being blown into the cockpit. To that end, a canvas filler strip (not shown) can be utilized having snaps along a lower edge thereof for engaging snaps 19 (provided for canvas top 16 when the air deflector of the invention is not installed). The upper edge of such canvas filler is provided with zipper teeth which will engage zipper slide and teeth 37 of canvas strip 36 which extends the length of airfoil 30.

Various models and brands of boats 10 will have differing designs of windshield frame 14. It is preferred that mounting brackets 21 be tailored to the particular boat and windshield frame to which the invention is to be attached. However, brackets 21 may also be formed such that the brackets can be adapted to more than one windshield frame 14. FIG. 4 shows a second mounting bracket 21A having bracket elements 35 and 39 with slotted openings for screws such that various thicknesses of windshield frames 14 can be accommodated therewith.

FIG. 5 presents a top view of a typical installation of the invention with a partially cut away canvas top 16.

Figure 6:
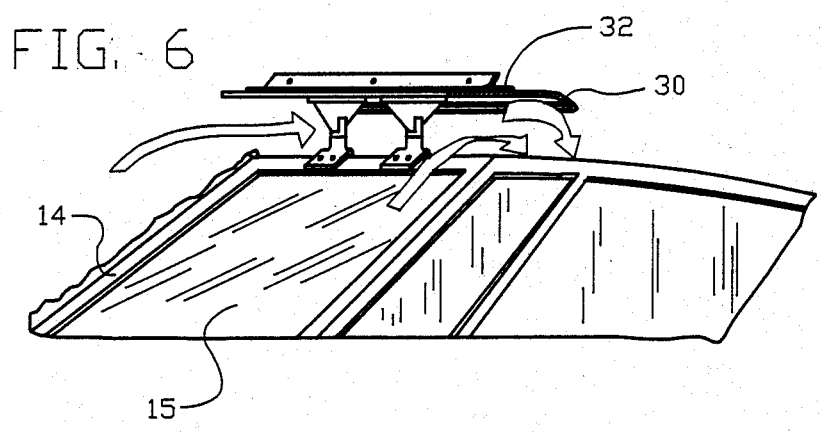
FIG. 6 is a partially cutaway view of the airfoil of FIG. 1 illustrating the air movement produced by the airfoil.

FIG. 6 is a partial view of an air deflector 12 showing air flow by the solid arrows.

Figure 7:
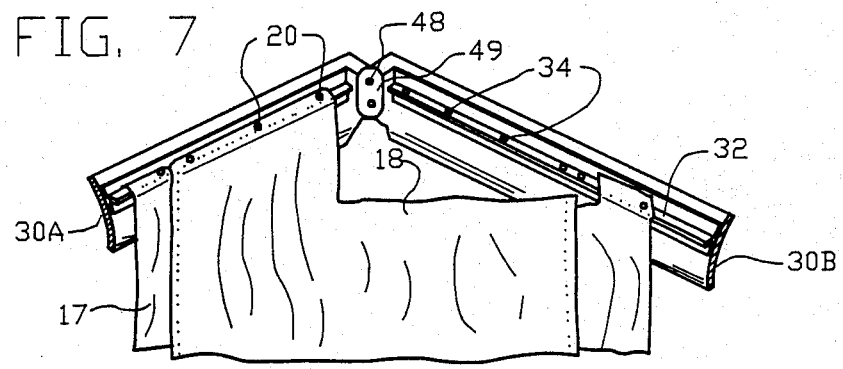
FIG. 7 shows the connection of portions of the airfoil which are adjustable to match the angles of a windshield.

The windshield 15 and windshield frame 14 for various boats may have a different angled pitch from that shown in the previous figures. When an air deflector of the invention is required that can be adapted to more than one boat, it is desirable that the angle between the two side portions thereof be adjustable over a reasonable degree. FIG. 7 shows a right airfoil 30A and a left airfoil 30B joined at the center by a pivot screw 48 and including a slot 49 which will permit adjustment of the angle between the two portions.

Figure 8:
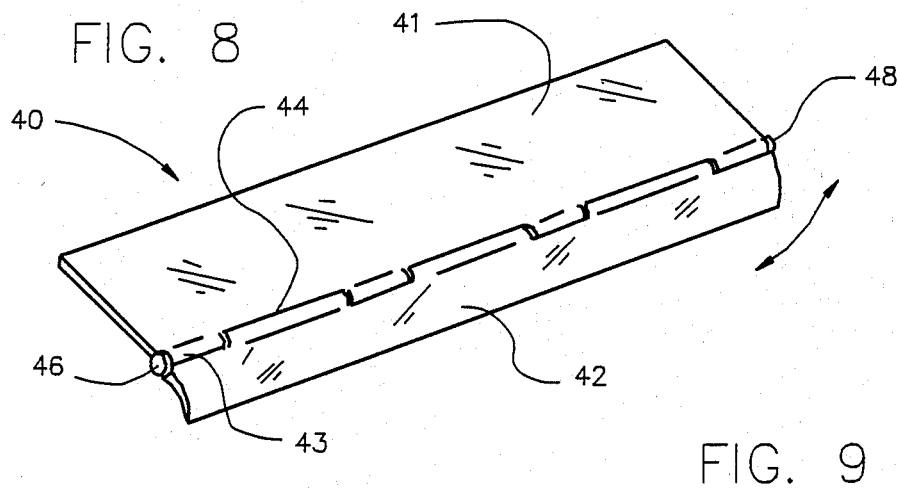
FIG. 8 is an airfoil of the invention having an adjustable camber.
Figure 9:
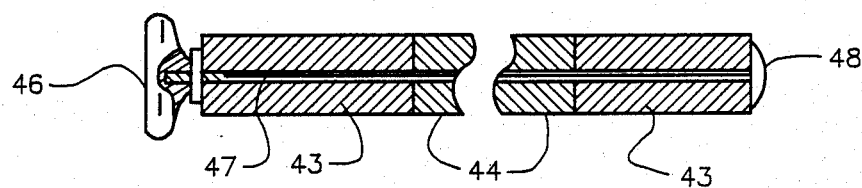
FIG. 9 is a cross-sectional view of the airfoil of FIG. 8.

FIG. 8 shows an alternative design for the airfoil of the invention. Here, airfoil 40 includes a leading edge portion 41 and a trailing edge portion 42 which is cambered to deflect air flowing below leading edge 41 downward. It may be desired to be able to adjust such downward air flow in accordance with the strength of the wind and the speed of the vessel. To that end, trailing edge 42 is pivotally hinged to leading edge 41 by an enlarged hinge portion 43 of leading edge 41 and hinge portion 44 of trailing edge 42 in combination with a hinge rod 47 seen in the partial cross-sectional view through the hinge area of FIG. 9. Hinge rod 47 includes a head and shoulder portion 48 which may be in the form of a carriage bolt head recessed into the end of hinge portion 43 to prevent hinge rod 47 from turning. As will be recognized, the camber of the airfoil 40 can be adjusted by loosening knob 46, and moving trailing edge 42 to the desired position, and thereafter securely tightening knob 46.

Figure 10:
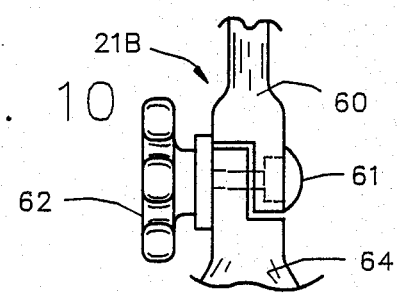
FIG. 10 is a rotary joint for an adjustable mounting bracket of the invention.
Figure 11:
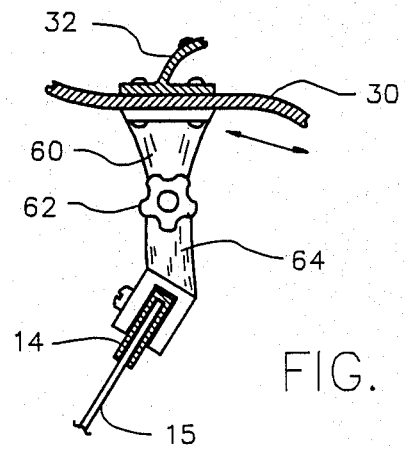
FIG. 11 is a cross-sectional view of an air deflector using the joint of FIG. 10.

FIGS. 10 and 11 illustrate an alternative construction of the invention to permit adjustment of the air flow into the cockpit area. As seen in FIG. 10, a rotary joint 65 is formed in a third embodiment a mounting bracket 21B having a bolt 61 and tightening knob 62. As seen from FIG. 11, air foil 30 may be adjusted forward or aft as indicated by the arrows to vary the angle of attack of the airfoil 30 to achieve the desired air flow. The airfoil 30 is locked in place by tightening of knob 62. Rotary joint 65 may include serrated surfaces therein to permit locking in discrete intervals if desired. The amount of movement of airfoil 30, achievable with the construction of FIGS. 10 and 11, will depend to some extent upon the design of the mounting bracket 21 and canvas top 16 since it is desirable to maintain the top in a taut condition. Where the rear bracket is not adjustable, bracket 21 may be moved to tighten the canvas top.

Figure 12:
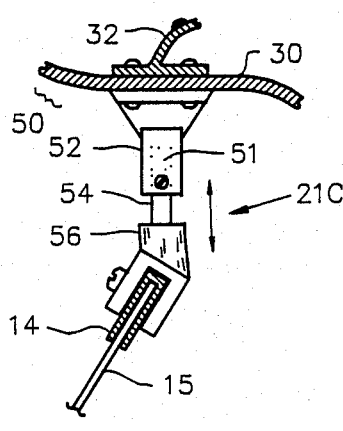
FIG. 12 is a cross-sectional view of an air deflector having a vertical adjustment.

FIG. 12 shows a fourth alternative design of mounting bracket 21C which permits adjustment of the gap produced between airfoil 30 and windshield frame 14. The mounting bracket 21C includes a shoulder 56 having a cylindrical rod 54 extending upward therefrom. Rod 54 engages cylindrical opening 51 and may be adjusted up or down as indicated by the arrow. When the desired gap is obtained, a set screw in bracket portion 52 may be tightened to secure the rod 54. FIG. 12 also shows a forward portion 50 of airfoil 30 curved slightly upward, permitting additional air to enter under airfoil 30.

As will be apparent to those of skill in the art, the airfoils of the invention can be formed from various materials. Acrylic or polycarbonate plastic is a preferred material and can be obtained in various colors, tints, and degrees of transparency, selected to compliment the design of the boat. However, fiberglass, aluminum, and other materials may also be used. Although the brackets and clamp bar are preferably metal, certain plastics may also be suitable.

It is to be understood, that the specific examples shown are for explanatory purposes only and that various modifications can be made to the invention without departing from the spirit and scope of the invention.

I claim:

1. An apparatus for securing and supporting a forward edge of an existing canvas top to an existing windshield with the windshield having a top edge and for directing a flow of air, comprising:
   - an air deflector extending in use substantially parallel to and coextensively with the top edge of the windshield for directing in use a flow of air;
   - said air deflector having a top surface and a lower surface;
   - a mounting means for permanently securing said lower surface of said air deflector in use to the top edge of the windshield and to permanently space said air deflector apart from the top edge of the windshield thereby forming an opening between the windshield and said air deflector to provide for air flow through said opening; and
   - a fastening means disposed on said air deflector for removably securing the forward edge of the canvas top to said top surface of said air deflector to enable in use the flow of air through said opening when said air deflector is secured to the top edge of the windshield and the canvas top is secured to said air deflector and to provide support of the forward edge of the canvas top.

2. The apparatus of claim 1 wherein said air deflector is an airfoil having a downward curving trailing edge.

3. The air deflector of claim 2 which further comprises an airfoil adjustment means for changing the angle of attack thereof.

4. The air deflector of claim 3 wherein said airfoil adjustment means includes a joint rotatable fore and aft for changing the angle of attack of said air deflector.

5. The apparatus of claim 2 in which said airfoil is formed from sheet plastic.

6. The apparatus of claim 5 in which said plastic is a polycarbonate type.

7. The air deflector of claim 1 in which said air deflector is an airfoil having an adjustable hinged trailing edge portion for controlling the flow of air.

8. The apparatus of claim 1 wherein said fastening means includes a canvas clamp bar disposed along said top surface of said air deflector; and
   a plurality of fasteners disposed along the length of said canvas clamp bar which cooperate with the forward edge of the canvas top to secure in use the canvas top to said top surface of said air deflector.

9. The apparatus of claim 1 wherein the forward edge of the canvas top is provided with a plurality of snaps extending along the forward edge of the canvas top;
   said fastening means including a canvas clamp bar disposed along said top surface of said air deflector;
   said canvas bar clamp extending in use substantially coextensively with the top edge of the windshield; and
   said canvas clamp bar includes a plurality of fasteners extending substantially coextensively along said canvas clamp bar which cooperate with said plurality of snaps of the canvas top such that the forward edge of the canvas top is securably attached to said top surface of said air deflector upon securely engaging in use said plurality of fasteners of said clamp bar with said plurality of snaps extending along the forward edge of the canvas top thereby securing the canvas top to said air deflector.

10. The apparatus for securing and supporting a forward edge of an existing canvas top to an existing windshield with the windshield having a top edge and for directing a flow of air, comprising:
    an air deflector extending in use substantially parallel to and coextensively with the top edge of the windshield for directing in use a flow of air;
    said air deflector having a top surface and a lower surface;
    a mounting means for securing said lower surface of said air deflector in use to the top edge of the windshield and to space said air deflector apart from the top edge of the windshield thereby forming an opening between the windshield and said air deflector to provide for air flow through said opening;
    a fastening means disposed on said air deflector for securing the forward edge of the canvas top to said top surface of said air deflector to enable in use the flow of air through said opening when said air deflector is secured to the top edge of the windshield and the canvas top is secured to said air deflector and to provide support of the forward edge of the canvas top;
    said mounting means including a plurality of clamps, with each clamp of said plurality of clamps being attached to the top edge of the windshield and having a rod with a length extending essentially vertically therefrom; and
    a bracket attached to said rod for securing to said lower surface of said air deflector.

11. The air deflector of claim 10 in which said length of said rod is adjustable for changing the width of said opening between the windshield and said air deflector.

12. The apparatus for securing and supporting a forward edge of an existing canvas top to an existing windshield with the windshield having a top edge and for directing a flow of air, comprising:
    an air deflector extending in use substantially parallel to and coextensively with the top edge of the windshield for directing in use a flow of air;
    said air deflector having a top surface and a lower surface;
    a mounting means for securing said lower surface of said air deflector in use to the top edge of the windshield and to space said air deflector apart from the top edge of the windshield thereby forming an opening between the windshield and said air deflector to provide for air flow through said opening; and
    a fastening means disposed on said air deflector for securing the forward edge of the canvas top to said top surface of said air deflector to enable in use the flow of air through said opening when said air deflector is secured to the top edge of the windshield and the canvas top is secured to said air deflector and to provide support of the forward edge of the canvas top
    said air deflector includes a right side portion and a left side portion; and
    a pivot screw pivotally securing said right side portion of said air deflector to said left side portion of said air deflector to enable said right side to pivot relative to said left side portion thereby enabling said air deflector to be pivotally adjusted to extend in use substantially parallel to and coextensively with each top edge of each windshield having a different angled pitch from one another.

13. An apparatus for securing and supporting a forward edge of an existing canvas top provided with a plurality of snaps extending along the forward edge of the existing canvas top to an existing windshield with the windshield having a top edge and for directing a flow of air, comprising:
    an air deflector extending in use substantially parallel to and coextensively with the top edge of the windshield for directing in use a flow of air;
    said air deflector having a top surface and a lower surface;
    a mounting means for permanently securing said lower surface of said air deflector in use to the top edge of the windshield and to permanently space said air deflector apart from said top edge of the windshield thereby forming an opening between the windshield and said air deflector to provide for air flow through said opening;
    said mounting means includes a plurality of clamps, with each clamp of said plurality of clamps being attached to the top edge of the windshield and having a rod with a length extending essentially vertically therefrom;
    a bracket attached to said rod for securing said lower surface of said air deflector;
    a fastening means disposed on said air deflector for removably securing the forward edge of the canvas top to said top surface of said air deflector to enable in use air to flow through said opening when said air deflector is secured to the windshield and the canvas top is secured to said air deflector and to provide support of the forward edge of the canvas top;
    said fastening means includes a canvas clamp bar disposed along said top surface of said air deflector; and said canvas bar clamp extending in use subtantially coextensively with the top edge of the windshield; and said canvas clamp bar includes a plurality of fasteners extending substantially coextensively along said canvas clamp bar which cooperate with the plurality of snaps of the canvas top such that the forward edge of the canvas top is securably attached to said top surface of said air deflector upon securely engaging in use said plurality of fasteners of said clamp bar with said plurality of snaps extending along the forward edge of the canvas top thereby securing the canvas top to said air deflector.

14. The apparatus of claim 13 wherein said air deflector includes a right side portion and a left side portion; and a pivot screw for pivotally securing said right side portion of said air deflector to said left side portion of said air deflector to enable said right side to pivot relative to said left side portion thereby enabling said air deflector to be pivotally adjusted to extend in use substantially parallel to and coextensively with each top edge of each windshield having a different angled pitch from one another.

15. The apparatus of use with a power boat having a windshield and a cockpit covered by a canvas top for securing and supporting a forward edge of the canvas top to the windshield having a top edge and for directing a flow of air into the cockpit covered by the canvas top, comprising;

an air deflector extending in use substantially parallel to and coextensively with the top edge of the windshield for directing in use a flow of air into the cockpit covered by the canvas top;

said air deflector having a top surface and a lower surface;

a mounting means for securing said lower surface of said air deflector in use to the top edge of the windshield and to space said air deflector apart from said top edge of the windshield thereby forming an opening between the windshield and said air deflector to provide for air flow through said opening and into the cockpit covered by the canvas top;

a fastening means disposed on said deflector for securing the forward edge of the canvas top to said top surface of said air deflector to enable in use air to flow through said opening and into the cockpit covered by the canvas top when said air deflector is secured to the wind shield and the canvas top is secured to said air deflector and to provide support of the forward edge of the canvas top;

said air deflector including a right side portion and a left side portion; and a pivot screw for pivotally securing said right side portion of said air deflector to said left side portion of said air deflector to enable said right side to pivot relative to said left side portion thereby enabling said air deflector to be pivotally adjusted to extend in use substantially parallel to and coextensively with each top edge of each windshield having a different angled pitch from one another.

* * * * *

UNITED STATES PATENT AND TRADEMARK OFFICE
CERTIFICATE OF CORRECTION

PATENT NO. : 4,881,484

DATED : November 21, 1989

INVENTOR(S) : John Cavanaugh

It is certified that error appears in the above-identified patent and that said Letters Patent is hereby corrected as shown below:

Column 1, line 61, after "a" delete "new or existing".

Column 2, line 3, after "a" insert --new or existing--.

Signed and Sealed this

Twenty-third Day of April, 1991

*Attest:*

HARRY F. MANBECK, JR.

*Attesting Officer*     *Commissioner of Patents and Trademarks*